United States Patent [19]
Ziolo

[11] Patent Number: 5,322,756
[45] Date of Patent: Jun. 21, 1994

[54] MAGNETIC FLUIDS AND METHOD OF PREPARATION

[75] Inventor: Ronald F. Ziolo, Webster, N.Y.

[73] Assignee: Xerox Corporation, Stamford, Conn.

[21] Appl. No.: 910,808

[22] Filed: Jul. 9, 1992

[51] Int. Cl.$^5$ .................... G03G 9/14; G03G 9/08
[52] U.S. Cl. .................... 430/106.6; 252/62.54; 252/62.56; 430/109; 430/110; 430/126; 430/137; 430/903
[58] Field of Search ............ 430/106.6, 137, 903, 430/126, 109, 110; 252/62.54, 62.56

[56] References Cited

U.S. PATENT DOCUMENTS

| | | | |
|---|---|---|---|
| 3,654,161 | 4/1972 | Geus | 427/128 |
| 3,867,299 | 2/1975 | Rohatgi | 252/62.54 |
| 3,977,984 | 8/1976 | Roberts | 252/62.54 |
| 4,022,701 | 5/1977 | Sawa et al. | 252/62.54 |
| 4,474,866 | 10/1984 | Ziolo | 430/106.6 |
| 4,622,281 | 11/1986 | Imai et al. | 430/107 |
| 4,758,275 | 7/1988 | Yubakami et al. | 106/20 |
| 4,760,009 | 7/1988 | Larson | 430/137 |
| 4,855,079 | 8/1989 | Wyman | 252/62.52 |
| 4,873,102 | 10/1989 | Chang et al. | 427/130 |
| 5,047,307 | 9/1991 | Landa et al. | 430/137 |
| 5,114,477 | 5/1992 | Mort et al. | 106/20 |

FOREIGN PATENT DOCUMENTS 0055065 6/1982 European Pat. Off. .

Primary Examiner—John Kight, III
Assistant Examiner—Shelley A. Dodson
Attorney, Agent, or Firm—Finnegan, Henderson, Farabow, Garrett & Dunner

[57] ABSTRACT

The invention provides low optical density magnetic fluid which is a stable dispersion of fine magnetic particles. The invention further provides a method of forming the stable dispersion which includes providing an ion exchange resin, loading the ion exchange resin with an ion capable of forming a magnetic phase, treating the loaded resin to form magnetic particles and micronizing the resin and magnetic particles in a fluid to form an aqueous stable colloid.

31 Claims, 3 Drawing Sheets

MAGNETIC FLUIDS AND METHOD OF PREPARATION

BACKGROUND OF THE INVENTION

1. Field of Invention

The invention relates to a ferrofluid having low optical density. Further, the invention relates to a method of preparing the ferrofluid. More particularly, the invention relates to a method of preparing an aqueous ferrofluid.

More specifically, the invention relates to a method for the preparation of colored ferrofluids using various colorants, dyes or pigments. Finally, the invention relates to xerographic magnetic liquid toners, colored xerographic magnetic liquid toners and liquid ink compositions and methods of preparation thereof.

2. Discussion of the Prior Art

The preparation of magnetic fluids is, in general, a very time intensive process most simply done by grinding a magnetic material such as magnetite, $Fe_3O_4$, in a suitable liquid vehicle in the presence of a dispersing agent or surfactant to obtain a stable colloidal magnetic fluid. This general preparation is described in detail in Rosensweig & Kaiser "Study of Paramagnetic Liquids," NASA Document N68-14205, Wilmington, Mass. 1967 and IEEE Transactions on Magnetics, Vol. MAG-16, No. 2, March 1980.

In a typical grinding or milling operation to produce magnetic fluids, grinding or milling times of 120–2900 hours (five days to four months) are required. The problem is in producing small enough magnetic particles to enable the formation of a stable colloid. The use of dispersing agents or surfactants is also a problem in that the correct or enabling surfactant must be found empirically. Furthermore, the surfactant may degrade or cause adverse chemical reactions in the magnetic fluid during its application.

In addition, prior art magnetic fluids are typically, by their very nature, black or very dark brown in color and therefore highly absorbent in the visible region of the spectrum. At the heart of such materials are magnetic materials such as iron, cobalt or nickel particles, iron oxide such as $Fe_3O_4$, and the like, generally in an assigned range of about 10–1000 Å. These prior art magnetic fluids are not particularly useful in applications requiring low optical density as they are highly absorbing. Examples of such applications include those requiring high magnetism and low optical density or high optical transmission, particularly in the visible and near infrared region of the spectrum, such as, magneto-optic and electro-optic effects.

Moreover, if a fluid with these magnetic properties is required to be colored, i.e. by mixing it with various colorants, dyes or pigments, the brown, black or muddy appearance of the prior art magnetic fluids produced a colored magnetic fluid which was also brown, black or muddy in appearance. Thus, applications requiring brightly colored fluids that are magnetic, for example, inks and toners were not possible using the prior art magnetic fluids. Moreover, when colorant was added to prior art magnetic fluids, a mixture of dye and magnetic fluid was formed. If a single component colored fluid was required, its formation was not possible using prior art magnetic fluids.

SUMMARY OF THE INVENTION

It is therefore an object of the invention to overcome these and other difficulties encountered in the prior art.

It is also an object of the present invention is to provide a fluid magnetic material, preferably a ferrofluid, which has a low optical density in the visible and near infrared wavelength region.

More particularly, an object of the present invention is to provide a stable aqueous dispersion of magnetic material, preferably a ferrofluid, having a low optical density in the visible and infrared wavelength region.

A further object of the present invention is to provide an expedient method of producing the magnetic fluids whereby the magnetic fluids do not require substantial milling or grinding.

Another object of the present invention is to provide a colored magnetic material using various colorants, pigments, dyes or brightly colored metal chelates.

Still another object of the present invention is to provide a method of making colored magnetic materials.

These and other objects have been achieved by the present invention which relates to a process for preparing a magnetic fluid and the product obtained thereby. The process of preparation comprises 1) providing a synthetic ion exchange resin; 2) loading or exchanging the resin with ions of iron, nickel, cobalt or ions capable of forming a magnetic phase; 3) treating the loaded resin to cause an in-situ formation of magnetic particles; 4) repeating the ion exchange process to increase the number and/or size of the particles; and 5) fluidizing the composite containing the resin and nanoscale magnetic particles by micronization to form a stable colloid of the magnetic particles. For the purposes of the present invention, a colloid or colloidal material is defined as a stable homogeneous dispersion of particles in a fluid medium.

The present invention provides a low optical density material thus making capable the coexistence of bright color and high magnetic strength in a single material. The invention drastically reduces magnetic fluid preparation times by two to four orders of magnitude, that is, to about 30–180 minutes. Furthermore, the invention eliminates the need for a dispersing agent or surfactant, which in prior art magnetic fluid preparation has caused uncontrollable foaming, leading to materials loss, instability and performance interference.

Thus, the present invention provides a product and a process of producing the product in which a stable colloid can be formed by fluidizing the composite through micronization of the ion exchange resin and magnetic particles as formed, in the chosen medium, preferably water. Moreover, the fluid formed has a low optical density.

Additional objects and advantages of the invention will be set forth in part in the description which follows, and in part will be obvious from the description, or may be learned by practice of the invention. The objects and advantages of the invention will be realized and attained by means of the elements and combination particularly pointed out in the appended claims.

DESCRIPTION OF THE PREFERRED EMBODIMENTS

Figure 1:
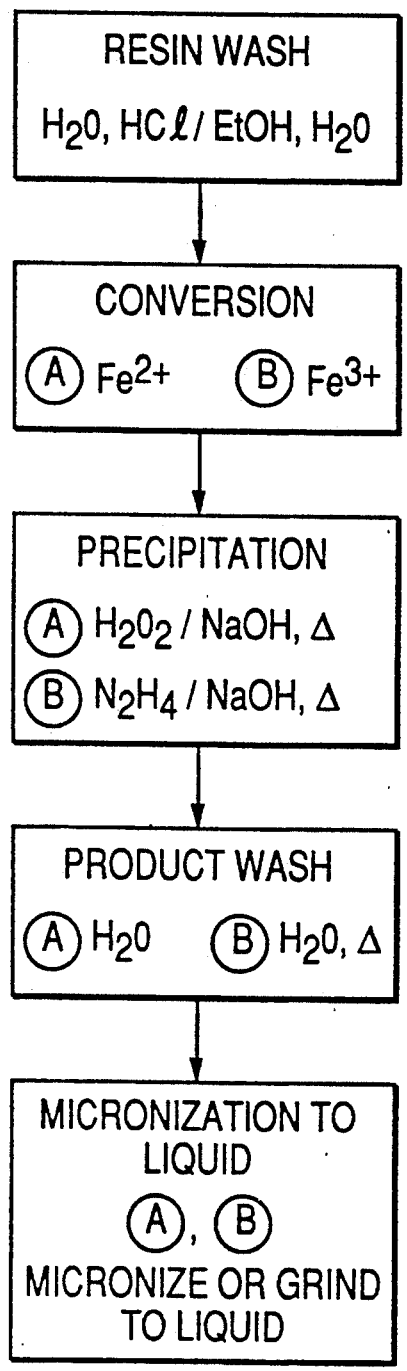
FIG. 1 is a flow chart diagram of the steps for preparation of a low optical density ferrofluid.

According to the invention, a composite material comprising an ion exchange resin and magnetic particles is prepared as described in U.S. Pat. No. 4,474,866 to Ziolo which is herein incorporated by reference.

A crosslinked polymer matrix having chemically addressable sites for ion exchange may be used. Such a matrix is provided by a synthetic ion exchange resin. A preferred resin is a polystyrene sulfonic acid (PSSA) ion exchange resin crosslinked from about 1 to 16% with divinylbenzene. More preferably, a 4 to 8% divinylbenzene crosslinked sulfonated polystyrene.

Illustrative examples of suitable cationic ion exchange resins include those polymers possessing chemically addressable sites dispersed throughout their matrix, or on their surface, which sites can be used to either generate a magnetic component in situ or cause the chemical binding of various chromophores to achieve the desired color. Specific examples of these resins include sulfonated polystyrenes, $R-CH_2SO_3-H^+$ strongly acidic phenolics, weakly acidic acrylics, $R-COO-Na^+$ wherein R is an alkyl group, weakly acidic chelating polystyrenes and the like, with strongly acidic sulfonated polystyrenes being preferred. Other suitable resins can be selected by one having ordinary skill in the art provided that they are colorless or have only slight color density, have a non-interfering color, and providing they achieve the objectives of the present invention.

The resin matrix is preferably capable of withstanding repeated cycles of drying, swelling, and de-swelling and preferably will not decompose thermally below 120° C. The resin is preferably unaffected by exposure to strong acids, bases or redox solutions.

The resin may be of an analytical or an industrial grade. Aside from differences in cost and size, the industrial grade resins have more color than the analytical grades. Most of the color associated with industrial grade resins is temporary and is easily removed by solvent washing, usually with water. After washing, the industrial grade resin retains a weak amber color similar to the analytical grade.

Resin beads may be about 20 to about 500 mesh and are preferably from about 20 to about 400 mesh size. More preferably, the resin beads are from about 200 to about 400 mesh. The larger size beads have two advantages over the smaller beads. First, the processing time is shorter when using the larger beads due to faster settling rates and ease of decanting. Second, the larger beads are mechanically weaker than the smaller bead due to greater osmotic shock effects during their manufacture. Thus, low optical density material prepared from the larger beads crushes and presumably micronizes more easily than those made from the smaller beads. Despite its weaker mechanical strength, the lower cost larger resin retains its ion-exchange capability through and even beyond ten-cycles of loading.

Commercial ion exchange resins for use in the invention include polystyrene sulfonic acid ion exchange resins which may be obtained from such manufacturers as Rohm and Haas and Dow Chemical.

Once a resin is selected, the resin matrix is next loaded with the precipitate precursor ion. In the case of the magnetic colloid this may be several different ions including ferrous or ferric ions. Examples of the precursor ions which may be used includes those derivable from transition metal ions, such as iron, cobalt, nickel, manganese, vanadium, chromium, rare earths and the like. These ions generally exist in the form of chlorides of the metal involved, such as ferrous chloride, ferric chloride, copper chloride, nickel chloride, and the like. The corresponding iodides, bromides and fluorides may also be suitable. Other sources of the cation include for example soluble salts such as water soluble iron acetate, nitrate, perchlorate, sulfate, thiocyanate, thiosulfate, nickel acetate, cobalt acetate and the like.

Next, the exchanged resin is treated so as to cause an in-situ formation of the magnetic phase. Magnetic $\gamma$-$Fe_2O_3$ (maghemite), for example, may be precipitated in this manner.

Once the composite material has been formed, the ion exchange process and subsequent formation of magnetic particles may then be repeated several times to achieve higher loading of magnetic particles to increase magnetic strength. As the number of particles increases or their size increases the crosslinked polymer matrix becomes stressed and eventually ruptures. In a typical ion exchange resin, stress may occur after the first loading.

Micronization as recognized within the present specification and the prior art, refers to the pulverization of materials in either a wet or dry state.

Micronization, by, for example, ball-milling of this composite in a stable medium or vehicle, will lead to the formation of the stable magnetic dispersion of the composite material in about 30 to about 180 minutes. A suitable vehicle is any vehicle which allows dispersion including for example water and water miscible materials and like solvents, such as methanol and the like. The vehicle may further include any material which will not adversely effect the desired mechanical, electrical or optical properties, for example, water soluble polymers.

Fluidization as used herein is defined as the formation of a liquid through micronization of the polymeric matrix containing the magnetic particles. Micronization may be accomplished by attrition, air attrition followed by dispersion in water, shaking, milling, ball milling, shaking or ball milling directly in water or the like. Shaking or ball milling are preferred. Coarse particles may be removed by filtration or centrifugation. The average micronization time is from about 30 to about 180 minutes.

The magnetic fluid thus produced comprises a stable dispersion of $\gamma$-$Fe_2O_3$ about 50 to about 150 Å in size, in water. Because of the small particle size, the bulk optical constants of the usually highly absorbent $\gamma$-$Fe_2O_3$ break down to the point where the optical density is reduced from between about 10 to about 90% of the original values. The optical absorbtion spectrum of such a fluid shows an absorption edge of about 570 nanometers in the window from about 600 to at least about 800 nanometers. A typical $\ln(_iO/I)/d$ value (in $cm^{-1}$) for such material at 700 nanometers is about 170. The optical transmission of the fluid according to the invention is improved from 10 to 80% over existing commercial ferrofluids. The magnetic saturation moment at 15 Kilogauss of the ferrofluid formed from the loaded resin begins at less than about one and is preferably from less than about 1 to about 10 emu/g depending upon the concentration of the magnetic particles.

When the fluid is contained in a cell or cast into a film (free standing or supported) and placed in a magnetic field, the Faraday rotation effect is realized; (i.e. the material will rotate the plane of plane-polarized visible light to a degree dependent on the applied field strength, the sample thickness and to a lesser extent on the wavelength of light). The fluid itself when examined visually has an unparalleled clarity with a deep red/brown or oxblood hue and lacks the black color of typical known ferrofluids.

As such the fluid may be dyed or may coexist with the colloidal suspension of a second constituent which may be colored pigment. Colored pigment may be added to the mix along with tile composite to achieve the desired color. In addition, since ion exchange capability is maintained in the composite itself, color may also be introduced directly in the polymer matrix by ion exchanging dyes or other chromophores into the resin.

There can be selected as pigments, known magenta, cyan, yellow pigments and mixtures thereof, as well as red, green, or blue pigments, or mixtures thereof, and the like.

Illustrative examples of magenta materials that may be used as pigments, include for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4(octadecyl-sulfonomido) phthalocyanine, X-copper phthalocyanine pigment listed in the Color Index as CI 74160, CI Pigment Blue, and Anthradanthrene Blue X2137, and the like. Illustrative examples of yellow pigments that may be employed include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron yellow SE/GLN, CI dispersed yellow 33, 2,5-dimethoxy-4-sulfonanilide phenylazo-4'-chloro-2,5-dimethoxy acetoacetanilide, permanent yellow FGL, and the like.

Illustrative examples of red materials useful as pigments include, cadmium red 150K, CI pigment red 108; lithol red, CI pigment red 49; lithol scarlet, CI pigment red 4301L; toluidene red, CI pigment red 3; and the like. Examples of green pigments include, chrome green, CI pigment green 15; chrome green lake, CI pigment green 18; chrome intra green, CI pigment green 21; phthalocyanine green, CI pigment green 7; and the like. Examples of blue pigments include, phthalocyanine blue, CI pigment blue15; prussion blue, CI pigment blue 27; ultramarine blue, CI pigment blue 29, and the like.

The color pigments, namely, red, green, blue, cyan, magenta and yellow pigments are generally present in an amount of from about 1 to about 20% and preferably from about 2 to about 10%. The pigment is introduced through attrition, air attrition, shaking, milling, ball milling or the like. The pigment particle size is selected so that it will not interfere with any of the desired material characteristics. The particles are preferably submicron in size but may be larger depending upon the intended color application. The ability to manipulate the size of the pigment particle to achieve the desired color result would be with the skill of the practitioner in the art.

Examples of suitable water soluble dyes include Bernacid Red Pontamine Brilliant Bond Blue A, BASF X-34, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brilliant Red X-2B (Reactive Red 56), available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical, Cartasol Yellow GTF Liquid Special 110, available from Sandoz, Inc., D&C Yellow #10 (Acid Yellow 3), available from Tricon, Yellow Shade 16948, available from Tricon, Basacid Black X34, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton- Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix ]Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P- BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-SB, Intracron Turquoise Blue GE, Intracron Turquoise HA, and Intracron Black RL, available from Crompton and Knowles, Dyes and Chemicals Division, and the like. Dyes that are invisible to the naked eye but detectable when exposed to radiation outside the visible wavelength range (such as ultraviolet or infrared radiation), such as dansyl-lysine, N-(2-aminoethyl)-4- amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(-triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl)stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8- disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable.

The dye is present in the composition in any effective amount, typically from about 1 to about 20% by weight, and preferably from about 2 to about 10% by weight, although the amount can be outside of this range. As will be recognized by the skilled artisan, the above listing of dyes and pigments are not intended to be limiting. Additional dyes and pigments for use in the present invention are readily recognizable by the skilled artisan.

Figure 2:
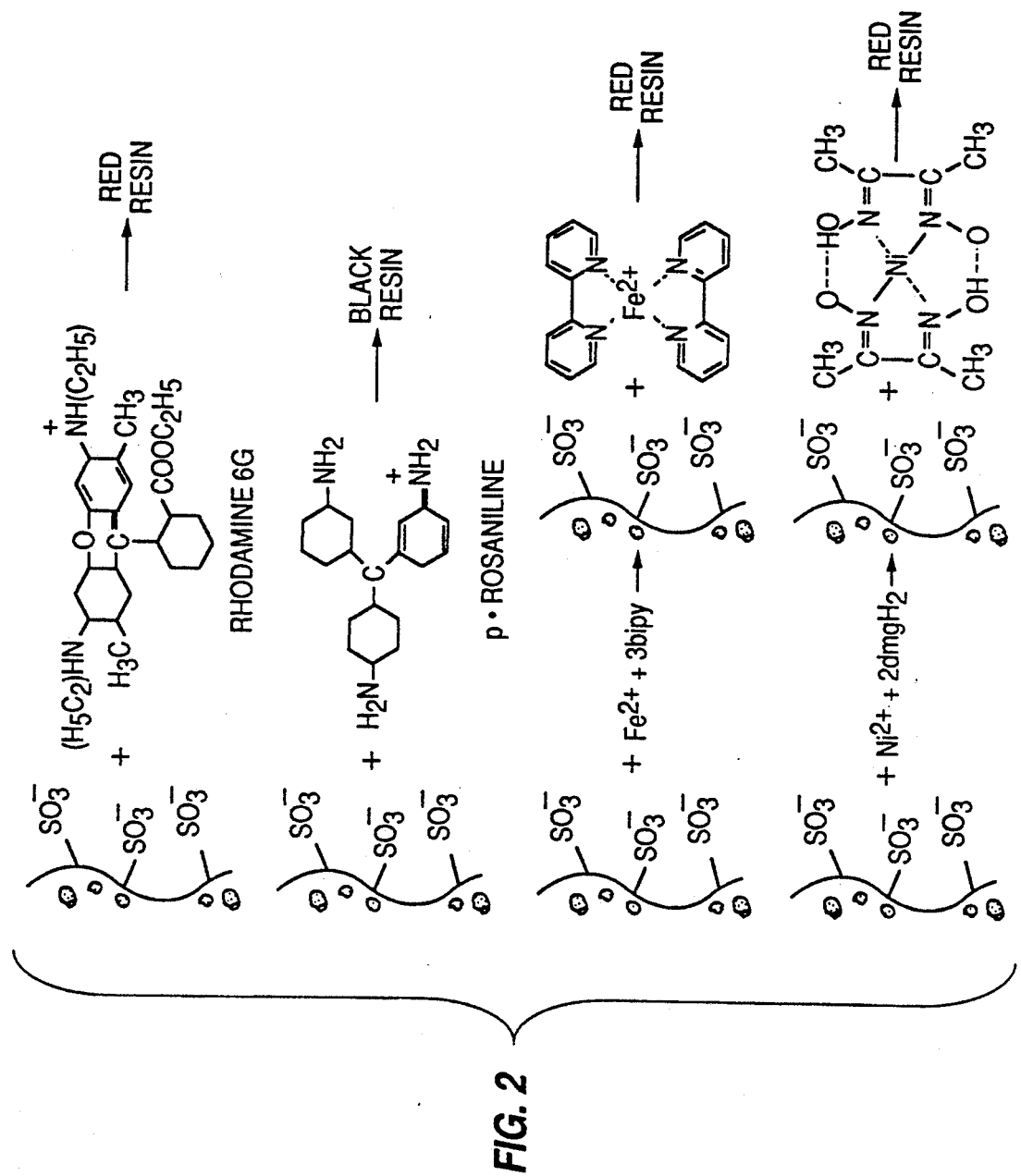
FIG. 2 illustrates direct coloring of the resin matrix.
Figure 3:
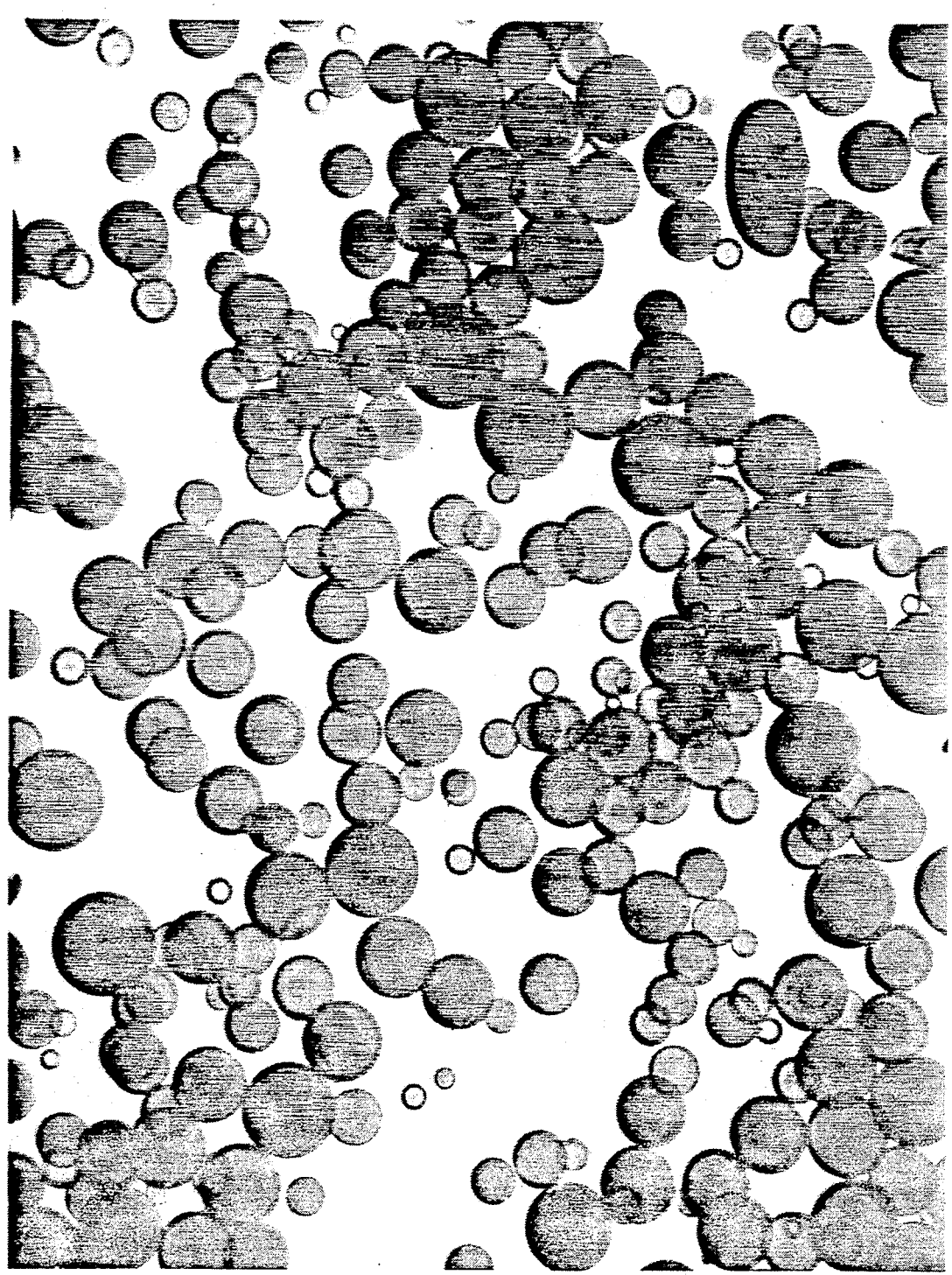
FIG. 3 illustrates a photographic representation of the magnetic low optical density resin beads containing the $Fe_2O_3$ particles.

Since ion exchange capability is maintained in the composite itself, color may also be introduced directly in the polymer matrix by ion exchanging dyes or other chromophores in the resin. Two examples of this approach are illustrated in FIG. 2. The first two direct coloring examples shown in FIG. 2 illustrate ion exchange of cationic dyes to produce red and black resins respectively.

In addition, again using the ion exchange capabilities of the resin, direct coloration can be achieved by the introduction of a metal that can form chromophores with known chelating agents and other chromophore producing materials. The second two direct coloring examples of FIG. 2 illustrate this method of direct precipitation of chromophores in the resin using iron(II) bipyridyl and nickel dimethylglyoxine to form red resins. Direct coloration has been found to be highly efficient and rapid using the micronized form of the composite. Any known dye may be used which is capable of ionic exchange with the resin, as described above. Methods of direct coloration are described in F. Helfferich, "Ion Exchange", McGraw-Hill, N.Y. 1962, and R. Paterson, "An introduction to Ion Exchange", Heyden and Son, Ltd., London, 1970, both of which are incorporated herein by reference.

Colored magnetic fluids prepared as described above are stable toward settling and do not separate color from the magnetic vehicle in an applied magnetic field.

The materials as described herein may be used in liquid development processes. In polarizable liquid development processes, as disclosed in U.S. Pat. No. 3,084,043 (Gundlach), the disclosure of which is totally incorporated herein by reference, liquid developers having relatively low viscosity and low volatility and relatively high electrical conductivity (relatively low volume resistivity) are deposited on a gravure roller to fill the depressions in the roller surface. Excess developer is removed from the lands between the depressions, and as a receiving surface charged in image configuration passes near the gravure roller, liquid developer is attracted from the depressions onto the receiving surface in image configuration by the charged image. Developers and processes of this type are disclosed in, for example, U.S. Pat. Nos. 4,047,943, 4,059,444, 4,822,710, 4,804,601, 4,766,049, Canadian Patent 937,823, Canadian Patent 926,182, Canadian Patent 942,554, British Patent 1,321,286, and British Patent 1,312,844, the disclosures of each of which are totally incorporated herein by reference.

When the liquid developer is intended for use in a polarizable liquid development system, the liquid developer is applied to an applicator such as a gravure roll and brought near an electrostatic latent image. The charged image polarizes the liquid developer in the depressions in the applicator, thereby drawing the developer from the depressions and causing it to flow to the image bearing member to develop the image. For this application, the liquid vehicle of the liquid developer is somewhat more viscous than is the situation with electrophoretic development, since particle migration within the developer is generally not necessary and since the liquid developer must be sufficiently viscous to remain in the depressions in the applicator prior to development. The viscosity, however, remains significantly lower than that typically observed for many printing inks, since the liquid developer must be capable of being pulled from the depressions in the applicator roll by the force exerted by the electrostatic latent image. Thus, liquid developers for use in polar development systems typically have a viscosity of from about 25 to about 500 centipoise at the operating temperature of the copier or printer, and preferably from about 30 to about 300 centipoise at the machine operating temperature. In addition, liquid developers intended for use in polarizable liquid development systems typically have a resistivity lower than liquid developers employed in electrophoretic or photoelectrophoretic development systems to enable the developer to become polarized upon entering proximity with the electrostatic latent image. The liquid developers of the present invention, however, generally have resistivities that are significantly higher than the resistivities of typical printing inks, for which resistivities generally are substantially less than about $10^9$ ohm-cm. Typically, liquid developers for polarizable liquid development systems have a resistivity of from about $10^8$ to about $10^{11}$ ohm-cm, and preferably from about $10^9$ to about $10^{10}$ ohm-cm.

Liquid developers generally comprise a liquid vehicle, a charge control additive, and a colorant. The liquid medium may be any of several hydrocarbon liquids conventionally employed for liquid development processes, such as hydrocarbons, including high purity alkanes having from about 6 to about 14 carbon atoms, such as Norpar ® 12, Norpar ® 13, and Norpar ® 15, available from Exxon Corporation, and including isoparaffinic hydrocarbons such as Isopar ® G, H, L, and M, available from Exxon Corporation, Amsco ® 460 Solvent, Amsco ® OMS, available from American Mineral Spirits Company, Soltrol ®, available from Phillips Petroleum Company, Pagasol®, available from Mobil Oil Corporation, Shellsol®, available from Shell Oil Company, and the like. Isoparaffinic hydrocarbons are preferred liquid media, since they are colorless, environmentally safe, and possess a sufficiently high vapor pressure so that a thin film of the liquid evaporates from the contacting surface within seconds at ambient temperatures. Generally, the liquid medium is present in a large amount in the developer composition, and constitutes that percentage by weight of the developer not accounted for by the other components. The liquid medium is usually present in an amount of from about 80 to about 98 percent by weight, although this amount may vary from this range.

The liquid developers of the present invention can also include a charge control agent. Examples of suitable charge control agents for liquid developers include the lithium, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper, lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum resinate, aluminum salt of 3,5 di-t-butyl gamma resorcylic acid. Mixtures of these materials may also be used. Particularly preferred charge control agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc with heptanoic acid; salts of barium, aluminum, cobalt, manganese, zinc, cerium, and zirconium octoates; salts of barium, aluminum, zinc, copper, lead, and iron with stearic acid; iron naphthenate; and the like, as well as mixtures thereof. The charge control additive may be present in any effective amount, typically from about 0.001 to about 3 percent by weight, and preferably from about 0.01 to about 0.8 percent by weight of the developer composition, although the amount can be outside this range. Other additives, such as charge adjuvants added to improve charging characteristics of the developer, may be added to the developers of the present invention, provided that the objectives of the present invention are achieved. Charge adjuvants such as stearates, metallic soap additives, polybutylene succinimides, and the like are described in references such as U.S. Pat. Nos. 4,707,429, 4,702,984, and 4,702,985, the disclosures of each of which are totally incorporated herein by reference.

The liquid developers of the present invention contain toner particles or colored toner particles in a liquid vehicle as described above. For example, the toner particles can consist solely of pigment particles dispersed in the liquid vehicle. Since the liquid vehicle is cured to a solid before, or after transfer, the pigment particles can become affixed to the print substrate by tile cured liquid vehicle, and no additional polymeric component is required in the developer for fixing purposes. If desired, however, a polymeric component can be present in the developer. The polymer can be soluble in the liquid vehicle, and can include polymers such as poly(2-ethyl hexylmethacrylate); poly(isobutylene-co-isoprenes), such as Kalene 800, available from Hardman Company, N.J.; polyvinyl toluene-based copolymers, including vinyl toluene acrylic copolymers such as Pliolite OMS, Pliolite AC, Pliolite AC-L, Pliolite FSA, Pliolite FSB, Pliolite FSD, Pliolite FSE, Pliolite VT, Pliolite VT-L, Pliolite VTAC, and Pliolite VTAC-L, available from the Goodyear Tire and Rubber Company, Neocryl S-1002 and EX519, available from Polyvinyl Chemistry Industries, Parapol 900, Parapol 1300, and Parapol 2200, available from Exxon Company, and the like; block copolymers such as poly(styrene-b- hydrogenated butadiene), including Kraton G available from Shell Chemical Company; and the like, as well as mixtures thereof, as disclosed in, for example, copending application U.S. Ser. No. 07/369,003, the disclosure of which is totally incorporated herein by reference. In addition, the polymer can be insoluble in the liquid vehicle, and can be present either as separate particles or as an encapsulating shell around the pigment particles. Examples of suitable polymers in this instance include ethylene-vinyl acetate copolymers such as the Elvax® I resins available from E.I. Du Pont de Nemours & Company, copolymers of ethylene and an -ethylenically unsaturated acid selected from acrylic or methacrylic acid, where the acid moiety is present in an amount of from 0.1 to 20 percent by weight, such as the Nucrel® II resins available from E.I. Du Pont de Nemours & Company, polybutyl terephthalates, ethylene ethyl acrylate copolymers such as those available as Bakelite DPD 6169, DPDA 6182 Natural, and DTDA 9169 Natural from Union Carbide Company, ethylene vinyl acetate resins such as DQDA 6479 Natural 7 and DQDA 6832 Natural 7 available from Union Carbide Company, methacrylate resins such as polybutyl methacrylate, polyethyl methacrylate, and polymethyl methacrylate, available under the trade name Elvacite from E.I. Du Pont de Nemours & Company, and others as disclosed in, for example, British Patent 2,169,416 and U.S. Pat. No. 4,794,651, the disclosures of which are totally incorporated herein by reference. Further, the polymer can be partially soluble in the liquid vehicle, or soluble in the vehicle at elevated temperatures of, for example, over 75° C. and insoluble at ambient temperatures of, for example, from about 10° C. to about 65° C. Examples of suitable polymers in this instance include polyolefins and halogenated polyolefins, such as chlorinated polypropylenes and poly-olefins, including polyhexadecenes, polyoctadecenes, and the like, as disclosed in copending U.S. application Ser. No. 07/300,395, the disclosure of which is totally incorporated herein by reference.

Polymeric components of the solids portion of the developers, when present, are present in any amount up to about 95 percent by weight of the solids component of the liquid developers of the instant invention.

The liquid developers of the present invention can also contain various polymers added to modify the viscosity of the developer or to modify the mechanical properties of the developed or cured image such as adhesion or cohesion. Examples of suitable viscosity controlling agents include thickeners such as alkylated polyvinyl pyrrolidones, such as Ganex V216, available from GAF; polyisobutylenes such as Vistanex, available from Exxon Corporation, Kalene 800, available from Hardman Company, New Jersey, ECA 4600, available from Paramins, Ontario, and the like; Kraton G-1701, a block copolymer of polystyrene-b- hydrogenated butadiene available from Shell Chemical Company, Polypale Ester 10, a glycol rosin ester available from Hercules Powder Company; and other similar thickeners. In addition, additives such as pigments, including silica pigments such as Aerosil 200, Aerosil 300, and the like available from Degussa, Bentone 500, a treated montmorillonite clay available from NL Products, and the like can be included to achieve the desired developer viscosity. Additives are present in any effective amount, typically from about 1 to about 40 percent by weight in the case of thickeners and from about 0.5 to about 5 percent by weight in the case of pigments and other particulate additives.

In addition, liquid developers of the present invention can also contain conductivity enhancing agents. For example, the developers can contain additives such as quaternary ammonium compounds as disclosed in, for example, U.S. Pat. No. 4,059,444, the disclosure of which is totally incorporated herein by reference.

The liquid developers of the present invention generally can be prepared by any method suitable for the type of toner particles selected. For example, the developer can be prepared by heating and mixing the ingredients, followed by grinding the mixture in an attritor until homogeneity of the mixture has been achieved.

Methods of preparing various kinds of liquid developers are disclosed in U.S. Pat. Nos. 4,476,210, 4,794,651, 4,877,698, 4,880,720, 4,880,432; and copending U.S. application Ser. Nos. 07/369,003 and 07/300,395, incorporated herein by reference. The charge control agent can be added to the mixture either during mixing of the other ingredients or after the developer has been prepared.

In general, images are developed with the liquid developers of the present invention by generating an electrostatic latent image and contacting the latent image with the liquid developer, thereby causing the image to be developed. When a liquid developer of the present invention suitable for polarizable liquid development processes is employed, the process entails generating an electrostatic latent image on an imaging member, applying the liquid developer to an applicator, and bringing the applicator into sufficient proximity with the latent image to cause the image to attract the developer onto the imaging member, thereby developing the image. Developers and processes of this type are disclosed in, for example, U.S. Pat. Nos. 4,047,943, 4,059,444, 4,822,710, 4,804,601, 4,766,049, 4,686,936, 4,764,446, Canadian Patent 937,823, Canadian Patent 926,182, Canadian Patent 942,554, British Patent 1,321,286, and British Patent 1,312,844, the disclosures of each of which are totally incorporated herein by reference. Any suitable means can be employed to generate the image. For example, a photosensitive imaging member can be exposed by incident light or by laser to generate a latent image on the member, followed by development of the image and transfer to a substrate such as paper, transparency material, cloth, or the like. In addition, an image can be generated on a dielectric imaging member by electrographic or ionographic processes as disclosed, for example, in U.S. Pat. Nos. 3,564,556, 3,611,419, 4,240,084, 4,569,584, 2,919,171, 4,524,371, 4,619,515, 4,463,363, 4,254,424, 4,538,163, 4,409,604, 4,408,214, 4,365,549, 4,267,556, 4,160,257, 4,485,982, 4,731,622, 3,701,464, and 4,155,093, the disclosures of each of which are totally incorporated herein by reference, followed by development of the image and, if desired, transfer to a substrate. If necessary, transferred images can be fused to the substrate by any suitable means, such as by heat, pressure, exposure to solvent vapor or to sensitizing radiation such as ultraviolet light or the like as well as combinations thereof. Further, the liquid developers of the present invention can be employed to develop electrographic images wherein an electrostatic image is generated directly onto a substrate by electrographic or ionographic processes and then developed, with no subsequent transfer of the developed image to an additional substrate.

The magnetic nanoscale materials prepared and disclosed in the invention may be incorporated into the liquid development compositions by mixing, and grinding if necessary, or by other known methods of incorporation, as disclosed in U.S. Pat. No. 4,760,009 to Larson. This may be by milling, attrition and the like. The images thus produced after incorporation and imaging are of high resolution with low background and may be magnetic, colored or magnetic and colored.

The materials of the present invention may also be incorporated in toner for use in compositions for developing latent electrostatic images as disclosed in U.S. Pat. No. 5,047,307 to Landa et al. Thus a magnetic-electrostatic toner composition may be prepared.

The materials as described herein may be used in liquid ink compositions, such as in ink jet applications, for example, as disclosed in U.S. Pat. No. 5,114,477 to Mort et al. which is herein incorporated by reference. The materials of the invention may be incorporated as described in Examples 6 and 7 below. The images thus produced may be magnetic, colored or magnetic and colored.

The materials as described herein may also be used in the formation of continuous films, surface coatings, thick films and free-standing films. Such films may be formed on any known substrate, for example glass, metal, selenium, silicon, quartz, fabric, fibers, paper and the like. Methods of forming these films preferably include evaporation, spin coating, dip coating, extrusion coating, gravure coating, roll coating, cast coating, brush coating, calender coating, meniscus coating, powdered resin coating, spray coating, electrostatic spray coating and by draw bar. Any known method of coating is acceptable. Examples of various coating methods may be found, for example in G. L. Booth, "Coating Equipment and Processes" Lockwood Publishing, New York, 1970; the Kirk-Othmer Encyclopedia of Chemical Technology, 3rd. ed., Wiley-Interscience, New York, 1979; and in "Ullmann's Encyclopedia of Industrial Chemistry," VCH Publishers, New York, 1991. Furthermore, the material of the invention may be mixed or otherwise added to known film forming materials such as polymers, plastics and the like to cast or produce films containing the material of the invention. Films formed from the material of the invention include for example mechanical, magnetic, optical or electronic device applications.

In one preferred embodiment of the small-particle growth technique, an ion exchange resin is used as the host matrix in which iron oxide is precipitated to form the magnetic composite. The resin consists of an insoluble porous network with attached ionic functional groups and is available in the form of spherical beads with diameters ranging from about one to several hundred microns. The resin is converted from the hydrogen or sodium ion form (exchangeable counterion) to the iron-ion form using water soluble iron (II) or iron (III) chlorides. Treatment of the converted resin with hydrogen peroxide or hydrazine and aqueous base leads to the desired product as illustrated by the following equations wherein R represents the bulk resin as described in U.S.

Pat. No. 4,474,866 to Ziolo incorporated herein by reference.

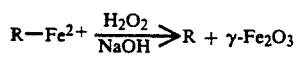

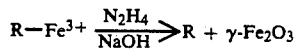

During this process, the ion exchange resin is regenerated in the sodium ion form. The magnetic composite may then be recycled a number of times in the manner described above to achieve the desired level of magnetic loading.

In a typical embodiment the ion exchange resin is treated with water soluble iron salt, aqueous base and a mild oxidizing agent according to the procedures described above to convert it to a magnetic form. The material is then collected by filtration, dried and is ready for use as a composite material comprising resin and iron oxide. In addition, the material may be dyed directly through its ion exchange properties for color application, as described above. The ball milled form of the composite material may be dyed as well.

The magnetic fluids according to the present invention can form the base for the formation of magnetic liquid toners and colored magnetic liquid toners as well as forming the base for a liquid ink composition. A colored magnetic liquid toner may be formed by using as one constituent, a magnetic fluid according to the present invention which has been dyed in the manner described above. The method of forming these inks and toners would be readily apparent to one having ordinary skill in the art.

The following examples are illustrative of the invention embodied herein.

Comparative Example 1

A dry product was prepared by mixing and reacting the appropriate components in a 4 liter glass beaker equipped with a suitable glass cover (190×100 ml Pyrex recrystallizing dish), a 3 inch magnetic stirring bar and a Corning hotplate stirrer. As the ion exchange resin there was selected a sulfonated polystyrene resin commercially available from J. T. Baker Inc., as CGC-241, 200-400 mesh, which resin was used in the form of the sodium salt. During the resin washing and preparation steps, the beaker was filled with water (deionized) and the contents stirred. The composition remained stationary allowing particles to settle and subsequently the mixture was decanted. The preparation sequence that follows relates to obtaining one batch of material wherein the sulfur to iron ratio was 3:1.

In a 4 liter beaker there was charged 1.5 lbs. of the CGC-241 resin, subsequent to removing from the resin, various impurities by washing with de-ionized water until the resulting effluent was clear and nearly colorless. Subsequently, the resin was then washed with hydrochloric acid, 1N, containing 95 percent of ethanol, followed by deionized water washing until the resulting effluent was colorless and has a neutral pH. A final washing was accomplished in aqueous sodium hydroxide, 1N, followed again by a deionized water washing until the resulting mixture had a neutral pH.

The CGC-241 resin obtained subsequent to the washings was now treated with a ferric chloride solution prepared by adding 2 lbs. of $Fe_3Cl_3.6H_2O$ to one liter of water and filtering rapidly through a 32 centimeter Whatman folded paper No. 2V. The iron solution was added directly to the purified resin simultaneously with a sufficient amount of water in order to completely substantially fill the beaker.

The resulting suspension was then stirred for 2 hours after which the solution was decanted and the resulting resin was washed with deionized water which washings were continued until no ferric ion remained in the effluent as determined by the absence of a deep red color when treated with a slightly acidic aqueous solution of potassium cyanide. The deep red color results from the formation of several thiocyanto complexes of iron with a valence of 3.

The resin was then suspended in a full beaker, 3.8 liters of water, stirred and heated to 60° C. on a hotplate stirred in a ventilated hood. Hydrazide, 100 milliliters, 95 percent purity, available from Eastman Kodak company as Eastman 902, was then added dropwise to the suspension over a period of an hour while the temperature was maintained at 60° C. During this period, the suspension was converted from a brown color to black and $NH_3$ was emitted. When the addition of hydrazine was complete, 100 milliliter of water containing 80 grams of sodium hydroxide was added directly to the resin suspension, followed by heating and stirring for about 24 hours. Subsequently, the solution was decanted and the resin washed with deionized water until a neutral pH was obtained.

The resin was then recovered in a 2 liter glass fritted filter and placed in a drying oven, at a temperature of 120° C. for about 16 hours. During this period, the black resin changes color to an amber red and the resulting beads which now contain iron oxide are optically transparent and have a lusterous appearance.

A fine powder of magnetic polymer resin was obtained by micronizing the 200 to 400 mesh polymer beads by milling. With the resin containing about 5 meq/gram total exchange capacity on the dry basis, the weight percent loading of iron oxide, $Fe_2O_3$, is about 12. At room temperature, the iron oxide containing polymer had a magnetic strength of about 9 emu/grams and was superparamagnetic as evidenced by the absence of any hysteresis in the magnetization curve.

Example 2

A 2 ml volume of three-cycled iron (III) ($Fe^{3+}$) resin, prepared according to the process described in Example 1, was added to 24 mls of deionized water and 285 grams of ⅛" steel shot (316) in a 4 oz. amber glass bottle. This mixture was then shaken vigorously on an industrial paint shaker for about 4 hours. The resulting liquid was then decanted from the steel shot, collected and centrifuged for about 2 hours at 7500 rpm. The resulting clear liquid was decanted and allowed to evaporate to about 5 mls, total volume, to produce a clear, reddish-brown liquid that is strongly magnetic and stable. The formed colloid shows a zeta potential of about −40 millivolts.

Example 3

About 25 grams of 10 cycled iron (II) ($Fe^{2+}$) resin produced by the process described in Example 1, was ball-milled in an 8 oz. glass jar containing 100 mls of water and 500 grams of ¼" steel shot (316) at about 90 ft/min for about 40 mins. The resulting fluid was decanted and centrifuged for 3 hours at 7500 rpm. The resulting clear liquid was decanted and allowed to evaporate to about 10 to 20 mls, total volume, to form a clear oxblood red liquid having a magnetic saturation moment of about 8 emu/g.

Example 4

Iron (III) ($Fe^{3+}$) loaded ionic exchange resin prepared as described in Example 1, was treated with a 0.8 molar aqueous solution of nickel chloride in order to affix $Ni^{2+}$ to the cationic exchange sites on the resin. After rinsing several times with 100 ml portions of deionized water to remove excess physisorbed $Ni^{2+}$, the resin was rinsed with an alcoholic solution of 10% dimethylglyoxine (DMG) wherein the resin turned bright red in color. Excess DMG was then removed from the resin by ethanol and ethanol/water rinses until no DMG appeared in the rinse solution. The bright red, magnetic resin (2 ml volume) was then treated as described in Example 3, to produce a brightly colored red magnetic liquid having a magnetic saturation moment of about 8 emu/g.

Example 5

A 4 ml volume of three-cycled iron (III) ($Fe^{3+}$) resin, prepared as described in Example 1, was added to 60 mls of deionized water and 600 grams of ⅛", steel shot (316) in an 8 oz. amber glass bottle. The mixture was shaken in a Red-Devil paint shaker for 5 hours, decanted and centrifuged for 2 hours at 7500 rpm. The liquid was then allowed to evaporate slowly to about 6 mls, total volume, to form a stable, transparent, magnetic fluid. This fluid was then poured onto a 5"×5" glass plate to effect uniform coverage and allowed to evaporate to dryness. The film formed thereby was magnetic and transparent to ordinary room light. The film displayed the well-known Faraday rotation effect in that the film, when in the presence of a magnetic field, in this case, 2000 Gauss, rotated the plane of the plane-polarized light.

Example 6

An ink composition comprising 2.5 percent by weight of the magnetic material produced in Example 2, 15 percent by weight of cyclohexyl pyrrolidone (obtained from GAF Corporation, Wayne, N.J.), 1 percent by weight of sodium lauryl sulfate (obtained from Fisher Scientific, Fair Lawn, N.J.), and 81.5 percent by weight of toluene was prepared by mixing together the ingredients at room temperature, 25° C., stirring to obtain a homogeneous solution, and filtering. The ink thus prepared can be incorporated into a thermal ink jet test fixture. It is believed that images of excellent resolution with no substantial background deposits can be obtained. The images thus produced are magnetic and may be colored by incorporating dyes or pigments as described in the above specification and FIG. 2.

Two additional inks can be prepared, said inks being of the same composition as above, except that one contained 0.1 percent by weight of CARBOWAX M20 TM (a polyethylene oxide/bisphenol-A polymer with a molecular weight of 18,000 (obtained from Union Carbide Corporation, Danbury, Conn.)), and 2.4 percent by weight of the fullerene, and the second ink contained 0.3 percent by weight of CARBOWAX M20 TM and 2.2 percent by weight of the fullerene. The CARBOWAX M20# is added to the ink at room temperature and the resulting mixture is stirred for about 5 minutes to obtain a homogeneous solution.

Example 7

An ink composition comprising 2.5 percent by weight of the magnetic material of Example 2, 15 percent by weight of ethylene glycol, 0.3 percent by weight of CARBOWAX M20 TM, and 82.2 percent by weight of water was prepared by mixing together the ingredients at room temperature, stirring for about 10 minutes to obtain a homogeneous solution, and filtering. The ink thus prepared was incorporated into a jetting test fixture. It is believed that images of excellent resolution with no substantial background deposits can be obtained. The images thus produced are magnetic and may be colored by incorporating dyes or pigments as described in the above specification and FIG. 2.

Other embodiments of the invention will be apparent to those skilled in the art froom consideration of the specification and practice of the invention disclosed herein. It is intended that the specification and examples be considered as exemplary only, with a true scope and spirit of the invention being indicated by the following claims.

We claim:

1. A method of forming a magnetic fluid consisting essentially of
   providing an ion exchange resin;
   loading said resin with an ion capable of forming a magnetic phase;
   treating the resin to cause in-situ formation of magnetic particles; and
   fluidizing said ion exchange resin and magnetic particles in an aqueous medium to form a stable colloid of magnetic particles.

2. The method according to claim 1, wherein said ion exchange resin and magnetic particles are micronized by ball milling.

3. The method according to claim 1, wherein said ion exchange resin and magnetic particles are micronized by air attrition followed by dispersion in a fluid.

4. The method according to claim 1, wherein said ion exchange resin and magnetic particles are micronized by shaking.

5. The method according to claim 1, wherein said loading and treating steps are repeated a plurality of times before the micronization step takes place.

6. The method according to claim 5, wherein said loading and treating steps are repeated 10 times.

7. The method according to claim 1, wherein said loading and treating steps are repeated until the ion exchange resin ruptures.

8. The method according to claim 1, wherein the ion capable of forming a magnetic phase is selected from those derived from iron, cobalt, nickel, manganese, vanadium, chromium or rare earths.

9. The method according to claim 1, wherein the ion capable of forming a magnetic phase is a ferrous ion.

10. The method according to claim 1, wherein the ion capable of forming a magnetic phase is a ferric ion.

11. The method according to claim 1, wherein the ion exchange resin is a polystyrene sulfonic acid ion exchange resin crosslinked with divinylbenzene.

12. The method according to claim 11, wherein the resin is about a 4 to 8% divinylbenzene crosslinked sulfonated polystyrene.

13. The method according to claim 1, wherein the resin is from about 20 to 400 mesh size.

14. The method according to claim 12, wherein the resin is from about 200 to 400 mesh size.

15. The method according to claim 1, wherein the fluidizing is carried out in from about 30 to about 180 minutes.

16. The method according to claim 1, wherein the magnetic particles are from about 50 to about 150 Å in size.

17. A low optical density magnetic fluid produced by the process according to claim 1.

18. A low optical density magnetic fluid comprising an aqueous stable colloid of magnetic particles
wherein the colloid contains a fluidized matrix of an ion exchange resin.

19. The magnetic fluid according to claim 18, wherein the magnetic particles are about 50 to about 150 Å in size.

20. The magnetic fluid according to claim 18, wherein the optical density is reduced by from about 25% to about 70% of the values for the material prior to fluidization.

21. The magnetic fluid according to claim 18, wherein the value of $\ln(I_o/I)/d$ at 700 nanometers is about 170 cm$^{-1}$.

22. The magnetic fluid according to claim 18, wherein the fluid has a magnetic saturation moment of from about less than 1 to about 8 emu/g.

23. A method of forming a single component colored magnetic fluid consisting essentially of the following steps in order:
providing an ion exchange resin;
loading said resin with an ion capable of forming a magnetic phase;
treating the resin to cause in-situ formation of magnetic particles; and
introducing a pigment, a dye, an ion exchange dye or a chromophore;
micronizing said ion exchange resin and magnetic particles in a fluid to form a stable colloid of magnetic particles.

24. The method according to claim 23, wherein the ion exchange dye or chromophore is red, blue, green, magenta, cyan, yellow or mixtures thereof.

25. A method of forming a low optical density colored magnetic fluid consisting essentially of the following steps in order:
providing an ion exchange resin;
loading said resin with an ion capable of forming a magnetic phase;
treating the resin to cause in-situ formation of magnetic particles;
micronizing said ion exchange resin and magnetic particles in a fluid to form a stable colloid of magnetic particles; and
introducing a pigment, a dye, an ion exchange dye or a chromophore.

26. The method according to claim 25, wherein the ion exchange dye or chromophore is red, blue, green, magenta, cyan, yellow or mixtures thereof.

27. A single component colored magnetic fluid comprising
a magnetic fluid as produced by the process according to claim 1 and a color component.

28. The colored magnetic fluid according to claim 27, wherein the color component is selected from a colloidal suspension of a colored pigment or dye, or an ion exchange dye or a chromophore.

29. The colored magnetic fluid according to claim 27, wherein the color component is red, blue, green, magenta, cyan, yellow or mixtures thereof.

30. The colored magnetic fluid according to claim 28, wherein the color component is present in an amount from about 1% to about 20%.

31. The colored magnetic fluid according to claim 30, wherein the color component is present in an amount from about 1% to about 10%.

* * * * *